United States Patent
Iwata et al.

(10) Patent No.: US 12,050,231 B2
(45) Date of Patent: Jul. 30, 2024

(54) MICRO FLOW PATH DEVICE, TESTING METHOD USING MICRO FLOW PATH DEVICE, AND TESTING APPARATUS USING MICRO FLOW PATH DEVICE

(71) Applicant: Shimadzu Corporation, Kyoto (JP)

(72) Inventors: Hiroshi Iwata, Kyoto (JP); Hiroomi Goto, Kyoto (JP); Shigehiko Zoda, Kyoto (JP); Eiichi Ozeki, Kyoto (JP); Takahiro Nishimoto, Kyoto (JP); Aline Rotzetter, Kyoto (JP); Yasuko Yoneda, Kyoto (JP); Ippei Takeuchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 318 days.

(21) Appl. No.: 17/615,893

(22) PCT Filed: May 25, 2020

(86) PCT No.: PCT/JP2020/020583
§ 371 (c)(1),
(2) Date: Dec. 2, 2021

(87) PCT Pub. No.: WO2020/246294
PCT Pub. Date: Dec. 10, 2020

(65) Prior Publication Data
US 2022/0308080 A1    Sep. 29, 2022

(30) Foreign Application Priority Data
Jun. 3, 2019  (JP) .................................. 2019-103580

(51) Int. Cl.
*G01N 35/08*   (2006.01)
*G02B 21/36*   (2006.01)

(52) U.S. Cl.
CPC ......... *G01N 35/085* (2013.01); *G02B 21/365* (2013.01)

(58) Field of Classification Search
None
See application file for complete search history.

(56) References Cited

U.S. PATENT DOCUMENTS

2005/0024636 A1*  2/2005  Nakamura ....... G01N 27/44721
                                                        356/318
2014/0349333 A1   11/2014  Matsumoto et al.

FOREIGN PATENT DOCUMENTS

JP         5828177       12/2015
JP      2017-067620       4/2017
(Continued)

OTHER PUBLICATIONS

Japanese Office Action issued Sep. 27, 2022 in corresponding Japanese Patent Application No. 2021-524772 with machine translation.
(Continued)

*Primary Examiner* — Brandi N Hopkins
*Assistant Examiner* — Nigel H Plumb
(74) *Attorney, Agent, or Firm* — Wenderoth, Lind & Ponack, L.L.P.

(57) ABSTRACT

A testing method using a micro flow path device configured for a test liquid containing a specimen to be brought into contact with a drug therein and for a test on an action of the drug on the specimen includes: preparing the micro flow path device including: a plurality of micro flow paths, first and second openings which are disposed at both ends of each of the plurality of micro flow paths and communicate with an outside, a storage unit which is provided in each of the plurality of micro flow paths and stores the drug, and a gas-permeable membrane covering the first opening; applying a fluid pressure higher than an external pressure to the (Continued)

test liquid through the second opening from a syringe pump connected to the second opening to pressure-feed the test liquid to the storage unit; and observing a target region set in the micro flow path.

14 Claims, 9 Drawing Sheets

(56) References Cited

FOREIGN PATENT DOCUMENTS

| | | | |
|---|---|---|---|
| JP | 2017-215288 | | 12/2017 |
| JP | 2017215288 | * | 12/2017 |

OTHER PUBLICATIONS

International Search Report issued Aug. 11, 2020 in International (PCT) Application No. PCT/JP2020/020583 with English translation.

Written Opinion of the International Searching Authority issued Aug. 11, 2020 in International (PCT) Application No. PCT/JP2020/020583 with English translation.

* cited by examiner

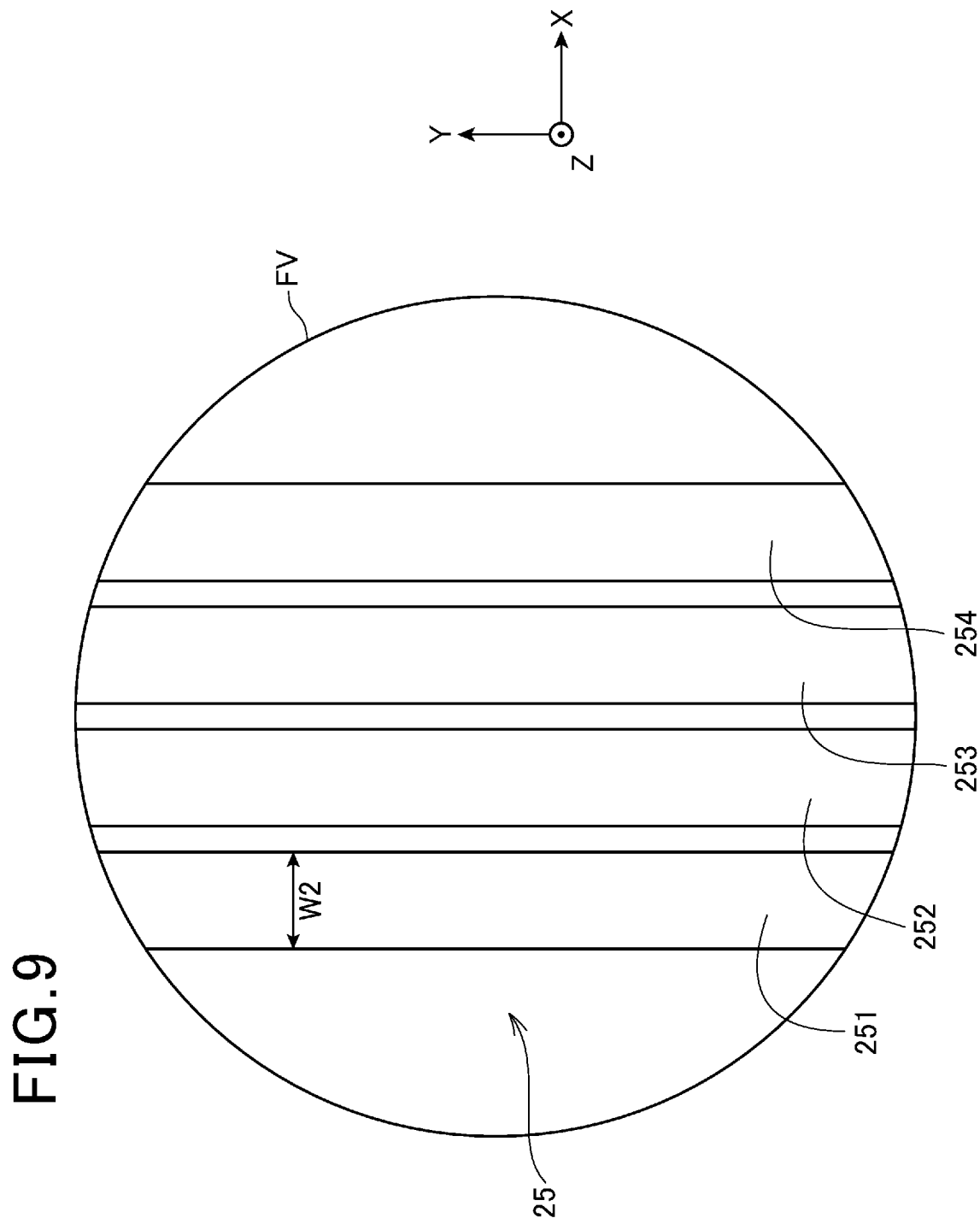

MICRO FLOW PATH DEVICE, TESTING METHOD USING MICRO FLOW PATH DEVICE, AND TESTING APPARATUS USING MICRO FLOW PATH DEVICE

TECHNICAL FIELD

The present invention relates to a micro flow path device, a testing method using the micro flow path device, and a testing apparatus using the micro flow path device.

BACKGROUND ART

A method for testing sensitivity of bacteria to an antibacterial drug or the like using a micro flow path device is known (see, for example, Patent Literature 1).

The micro flow path device described in Patent Literature 1 includes an introduction port and a discharge port for communicating with the outside, and a flow path through which a test liquid supplied from the introduction port flows toward the discharge port. The flow path is provided with a reaction unit in which the test liquid supplied from the introduction port is stored. The discharge port is disposed on the downstream side in the inflow direction of the test liquid in the reaction unit. Further, a drug is disposed in the reaction unit, and the drug acts on bacteria in the reaction unit.

CITATION LIST

Patent Literature

Patent Literature 1: JP 2017-67620 A

SUMMARY OF INVENTION

Technical Problem

The present inventors have found that it is important to stabilize a concentration with the drug being dissolved in the test liquid in order to accurately test the action of the drug on a specimen (bacteria or the like) by bringing the test liquid into contact with the drug.

In a conventional method of testing the action of the drug using a micro flow path device, the concentration of the drug has not been fully studied.

An object of the present invention is, in a testing method including bringing a test liquid containing a specimen into contact with a drug and testing an action of the drug on the specimen, to stabilize a concentration with a drug being dissolved in a test liquid.

Solution to Problem

The specification of this application contains the whole content of Japanese Patent Application No. 2019-103580 filed on Jun. 3, 2019.

A first aspect of the present invention relates to a testing method using a micro flow path device, the device configured for a test liquid containing a specimen to be brought into contact with a drug therein and for a test on an action of the drug on the specimen, the method including: preparing a micro flow path device which includes: a plurality of micro flow paths, a first opening and a second opening which are disposed at both ends of each of the plurality of micro flow paths and communicate with an outside, a storage unit which is provided in each of the plurality of micro flow paths and stores the drug, and a gas-permeable membrane which covers the first opening; applying a fluid pressure higher than an external pressure to the test liquid through the second opening from a pressure source connected to the second opening to pressure-feed the test liquid to the storage unit; and observing a target region set in the micro flow path.

A second aspect of the present invention relates to a micro flow path device configured for a test liquid containing a specimen to be brought into contact with a drug therein and for a test on an action of the drug on the specimen, the device including: a first micro flow path which has a first end and a second end and allows the test liquid to flow therethrough; a storage unit in which the drug is stored and which is connected to the second end such that the test liquid is allowed to flow therethrough; a first opening which communicate with the storage unit; and a gas-permeable membrane which covers the first opening.

A third aspect of the present invention relates to a testing apparatus using a micro flow path device, the device configured for a test liquid containing a specimen to be brought into contact with a drug therein and for a test on an action of the drug on the specimen, the testing apparatus including: the micro flow path device which includes a first micro flow path which has a first end and a second end and allows the test liquid to flow therethrough, a storage unit in which the drug is stored and which is connected to the second end such that the test liquid is allowed to flow therethrough, a first opening which communicate with the storage unit, a gas-permeable membrane which covers the first opening, a second micro flow path which allows the storage unit and the first opening to communicate with each other and the test liquid to flow therethrough, and a second opening which is formed at the first end; a pump which is connected to the second opening and applies air pressure to the test liquid; a table on which the micro flow path device is placed; a drive mechanism which drives the table along a horizontal direction; and a control unit which controls the drive mechanism, wherein the control unit causes the drive mechanism to drive the table such that the second micro flow path is positioned in an imaging region of a microscope.

Advantageous Effects of Invention

According to the first aspect of the present invention, the first opening formed in communication with the storage unit in the micro flow path device is covered with the gas-permeable membrane, and the method includes applying the fluid pressure higher than the external pressure to the test liquid to pressure-feed the test liquid to the storage unit.

Thus, the air contained in the test liquid stored in the storage unit permeates through the opening formed in communication with the storage unit and the gas-permeable membrane to be released, and the test liquid does not permeate through the gas-permeable membrane. Therefore, the storage unit is filled with the test liquid, and an appropriate amount of the test liquid can be easily stored in the storage unit. As a result, the concentration after the drug is dissolved in the test liquid can be stabilized.

According to the second aspect of the present invention, the micro flow path device includes the first micro flow path which allows the test liquid to flow therethrough, the storage unit in which the drug is stored and into which the test liquid flows through the first micro flow path, the first opening formed in communication with the storage unit, and the gas-permeable membrane which covers the first opening.

Thus, when the test liquid flows into the storage unit through the first micro flow path, and the storage unit is filled with the test liquid, the outflow of the test liquid through the first opening is restricted by the gas-permeable membrane. Therefore, the storage unit is filled with the test liquid, and an appropriate amount of the test liquid can be easily stored in the storage unit. As a result, the concentration after the drug is dissolved in the test liquid can be stabilized.

According to the third aspect of the present invention, an appropriate amount of test liquid can be easily stored in the storage unit by using the micro flow path device of the second aspect. Therefore, the concentration after the drug is dissolved in the test liquid can be stabilized.

BRIEF DESCRIPTION OF DRAWINGS

FIG. 9 is a view illustrating an example of a captured image of the micro flow path device according to the second embodiment.

DESCRIPTION OF EMBODIMENTS

Hereinafter, embodiments of the present invention will be described with reference to the drawings.

Further, in the following description, description will be made with reference to an X axis, a Y axis, and a Z axis orthogonal to each other. The Z axis is disposed along a vertical direction. The X axis and the Y axis are disposed along a horizontal direction. The X axis indicates a right-left direction, and the Y axis indicates a front-rear direction.

[1. Configuration of Micro Flow Path Device According to First Embodiment]

Figure 1:
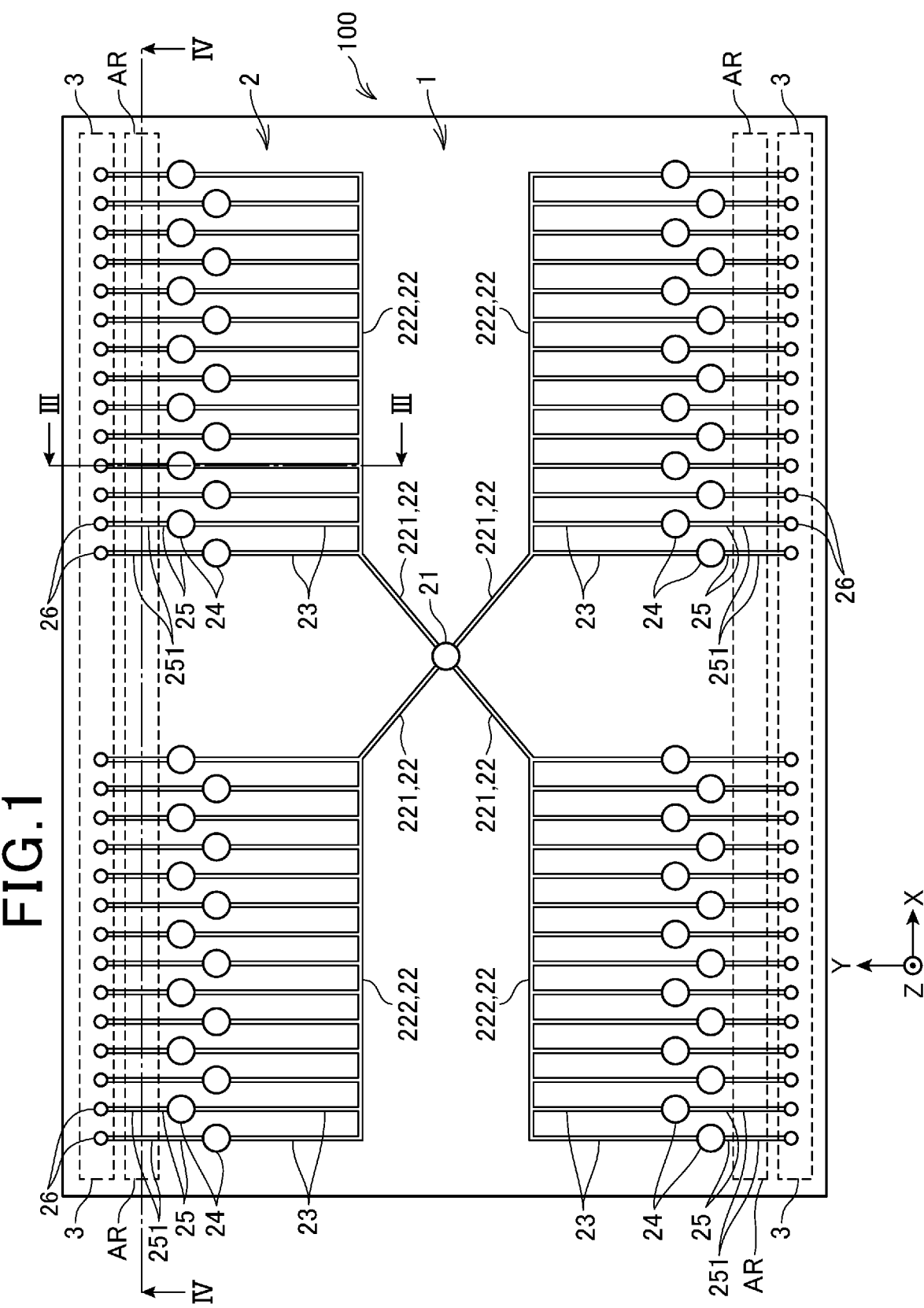
FIG. 1 is a plan view illustrating an example of a micro flow path device according to a first embodiment of the present invention.

FIG. 1 is a plan view illustrating an example of a micro flow path device 100 according to a first embodiment of the present invention. The micro flow path device 100 is placed on a table of the testing apparatus. The testing apparatus will be described later with reference to FIG. 4.

As illustrated in FIG. 1, the micro flow path device 100 includes a plate-shaped member 1, a flow path structure 2, and a gas-permeable membrane 3. The plate-shaped member 1 will be described in detail later with reference to FIG. 2.

The flow path structure 2 includes an opening 21, a micro flow path 22, a micro flow path 23, a storage unit 24, a micro flow path 25, and an opening 26.

The opening 21 corresponds to an example of the "second opening". The micro flow path 22 and the micro flow path 23 correspond to an example of the "first micro flow path". The opening 26 corresponds to an example of the "first opening". The micro flow path 25 corresponds to an example of the "second micro flow path". The micro flow path 22, the micro flow path 23, and the micro flow path 25 correspond to an example of the "micro flow path".

The opening 21 is disposed at one end of the micro flow path 22. Through the opening 21, a test liquid is pressed into the micro flow path 22 using fluid pressure. In this embodiment, air pressure is used as the fluid pressure. The opening 21 has, for example, a circular cross section. The diameter of the opening 21 is, for example, 5 μm to 5 mm. In the first embodiment, four micro flow paths 22 are connected to the opening 21. The four micro flow paths 22 are disposed radially around the opening 21.

In the first embodiment, the four micro flow paths 22 are connected to the opening 21, but the content of the embodiment of the present invention is not limited thereto. At least one micro flow path 22 may be connected to the opening 21. Further, two micro flow paths 22 may be connected to the opening 21, or three micro flow paths 22 may be connected to the opening 21. Further, five or more micro flow paths 22 may be connected to the opening 21.

The test liquid contains a specimen. The specimen may be bacteria (pathogenic bacteria in a specific example). In a specific example, the test liquid may be a suspension of bacteria.

The micro flow path 22 is configured to allow the test liquid to flow therethrough. One end of the micro flow path 22 is connected to the opening 21, and the other end of the micro flow path 22 is connected to the micro flow path 23.

The micro flow path 22 allows the test liquid flowing in through the opening 21 to flow into the micro flow path 23. The cross section of the micro flow path 22 is rectangular, and the width of the micro flow path 22 is, for example, 1 μm to 1 mm. A plurality of micro flow paths 23 are connected to the micro flow path 22. In the first embodiment, 14 micro flow paths 23 are connected to one micro flow path 22. In other words, one micro flow path 22 branches into the 14 micro flow paths 23.

The micro flow path 22 includes a flow path 221 and a flow path 222.

One end of the flow path 221 is connected to the opening 21, and the other end of the flow path 221 is connected to the flow path 222. Four flow paths 221 are radially disposed around the opening 21.

One end of the flow path 222 is connected to the flow path 221, and the other end of the flow path 222 is connected to the micro flow path 23. The flow path 222 is disposed along an X-axis direction. The 14 micro flow paths 23 are connected to one flow path 222. In other words, one flow path 222 branches into the 14 micro flow paths 23.

The micro flow path 23 is configured to allow the test liquid to flow therethrough. The micro flow path 23 is disposed along a Y-axis direction. One end of the micro flow path 23 is connected to the micro flow path 22, and the other end of the micro flow path 23 is connected to the storage unit 24. Specifically, the end of the micro flow path 23 in a negative direction (forward direction) of the Y axis is connected to the micro flow path 22, and the end of the micro flow path 23 in a positive direction (backward direction) of the Y axis is connected to the storage unit 24.

The micro flow path 23 allows the test liquid flowing in through the micro flow path 22 to flow to the storage unit 24.

The cross section of the micro flow path 23 is rectangular, and the width of the micro flow path 23 is, for example, 1 µm to 1 mm.

The storage unit 24 is disposed with a drug, and is connected to the micro flow path 23 to store the test liquid flowing in through the micro flow path 23. In the storage unit 24, the test liquid reacts with the drug. The drug is, for example, an antibacterial drug. The drug may be a solid or a liquid. The drug is placed on the storage unit 24 in advance. That is, before the test liquid flows into the storage unit 24, the drug is placed on the storage unit 24. In this embodiment, the drug is applied to the entire storage unit 24.

The storage unit 24 is formed in a rectangular parallelepiped shape. The length of one side of the storage unit 24 is, for example, 10 µm to 10 mm.

In FIG. 1, 56 (=14×4) storage units 24 are formed in the plate-shaped member 1. The volumes of the test liquids stored in the 56 storage units 24 are the same. On the other hand, the type of drug and the amount of drug placed in the 56 storage units 24 may be the same as or different from each other.

The micro flow path 25 is configured to allow the test liquid to flow therethrough. The micro flow path 25 is disposed along the Y-axis direction. One end of the micro flow path 25 is connected to the storage unit 24, and the other end of the micro flow path 25 is connected to the opening 26. Specifically, the end of the micro flow path 25 in the negative direction (forward direction) of the Y axis is connected to the storage unit 24, and the end of the micro flow path 25 in the positive direction (upward direction) of the Y axis is connected to the opening 26.

The micro flow path 25 allows the test liquid flowing in from the storage unit 24 to flow to the opening 26. The cross section of the micro flow path 25 is rectangular, and the width of the micro flow path 25 is, for example, 1 µm to 1 mm.

The opening 26 is connected to the other end of the micro flow path 25. Specifically, the opening 26 is connected to an end of the micro flow path 25 in the positive direction (backward direction) of the Y axis. The opening 26 has, for example, a circular cross section. The diameter of the opening 26 is, for example, 5 µm to 5 mm.

The opening 26 is covered with the gas-permeable membrane 3. Specifically, in FIG. 1, 56 (=14×4) openings 26 are formed in the plate-shaped member 1. Among the 56 openings 26, 28 openings 26 formed at the end of the plate-shaped member 1 in the positive direction of the Y axis are covered with one gas-permeable membrane 3, and 28 openings 26 formed at the end of the plate-shaped member 1 in the negative direction of the Y axis are covered with one gas-permeable membrane 3. Each of the two gas-permeable membranes 3 is disposed along the X-axis direction.

The gas-permeable membrane 3 has a function of allowing gas to permeate and not allowing liquid to permeate. Examples of the material of the gas-permeable membrane 3 include polytetrafluoroethylene (PTFE). The gas-permeable membrane 3 preferably has water repellency. The thickness of the gas-permeable membrane 3 is 1 mm or less.

The gas-permeable membrane 3 is fixed to the plate-shaped member 1 by adhesion using an adhesive, ultrasonic fusion, or the like. Examples of the adhesive include a photocurable resin, a thermosetting resin, and a pressure sensitive resin.

An imaging target region AR is disposed in the micro flow path device 100. The imaging target region AR is disposed in the micro flow path 25. The imaging target region AR indicates a region imaged by a microscope. The imaging target region AR is disposed at a position separated from the storage unit 24. In a case where the drug is mixed with the test liquid in the storage unit 24, the imaging target region AR is disposed in a region where the mixture of the drug and the test liquid in the storage unit 24 is diffused within a predetermined time. The predetermined time is, for example, several hours.

The micro flow path 25 included in the imaging target region AR will be referred to as a flow path 251 as illustrated in FIG. 1. That is, the microscope images the flow path 251. In this embodiment, the microscope is a phase-contrast microscope. In other embodiments, the microscope may be an optical microscope. Imaging with a microscope will be described in detail below with reference to FIG. 4.

Figure 2:
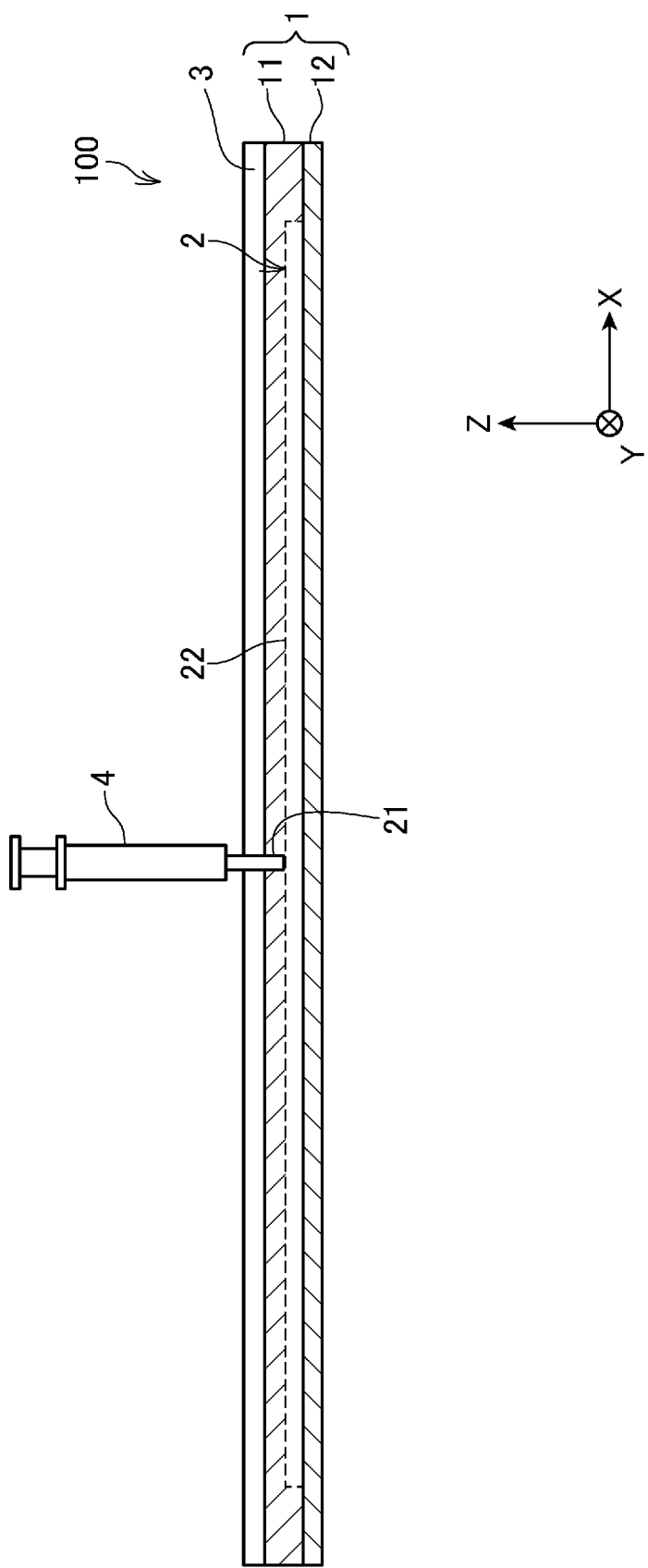
FIG. 2 is a side sectional view illustrating the example of the micro flow path device according to the first embodiment.

FIG. 2 is a side sectional view illustrating the example of the micro flow path device 100 according to the first embodiment. Specifically, FIG. 2 is a side sectional view along the micro flow path 22 of the micro flow path device 100.

As illustrated in FIG. 2, the plate-shaped member 1 includes a first plate-shaped member 11 and a second plate-shaped member 12. The second plate-shaped member 12 is stacked on the first plate-shaped member 11. The second plate-shaped member 12 is disposed in the negative direction (downward direction) of the Z axis with respect to the first plate-shaped member 11.

The first plate-shaped member 11 is formed in a rectangular plate shape using a transparent material. Examples of the material of the first plate-shaped member 11 include an acrylic resin such as a polymethyl methacrylate resin. The flow path structure 2 is formed in the first plate-shaped member 11. Specifically, the opening 21, the micro flow path 22, the micro flow path 23, the storage unit 24, the micro flow path 25, and the opening 26 are formed in the first plate-shaped member 11. In FIG. 2, the opening 21 and the micro flow path 22 are illustrated.

The thickness of the first plate-shaped member 11 is not particularly limited, and is set to, for example, 0.5 mm to 3 mm.

The second plate-shaped member 12 is formed in a rectangular plate shape using a transparent material. Examples of the material of the second plate-shaped member 12 include an acrylic resin such as a polymethyl methacrylate resin. The second plate-shaped member 12 functions as a part of the flow path structure 2. Specifically, the second plate-shaped member 12 functions as the lower surface of the micro flow path 22, the micro flow path 23, the storage unit 24, and the micro flow path 25.

The thickness of the second plate-shaped member 12 is not particularly limited, but is set to, for example, 0.5 mm to 3 mm.

The second plate-shaped member 12 is directly fixed to the first plate-shaped member 11 by ultrasonic melting, but may be fixed via an adhesive. In the first embodiment, a case where the second plate-shaped member 12 is made of acrylic resin is described, but the second plate-shaped member 12 may be made of glass.

A syringe pump 4 is connected to the opening 21. The syringe pump 4 presses the test liquid into the micro flow path 22 through the opening 21. Specifically, the syringe pump 4 applies air pressure to the test liquid to press the test liquid into the micro flow path 22 through the opening 21.

The syringe pump 4 corresponds to an example of the "pump". Further, the syringe pump 4 corresponds to an example of the "pressure source".

The test liquid flowing into the micro flow path 22 is stored in the storage unit 24 via the micro flow path 23 illustrated in FIG. 1. Further, when the syringe pump 4 applies air pressure to the test liquid, the test liquid overflows from the storage unit 24 and flows into the micro flow path 25.

Then, when the micro flow path 25 is filled with the test liquid, the syringe pump 4 applies air pressure to the test liquid, so that air contained in the test liquid is discharged to the outside of the micro flow path device 100 via the opening 26 and the gas-permeable membrane 3. In this way, the air contained in the test liquid can be discharged to the outside of the micro flow path device 100. In the embodiments of the present invention, "outside" refers to the outside of the micro flow path device 100.

Figure 3:
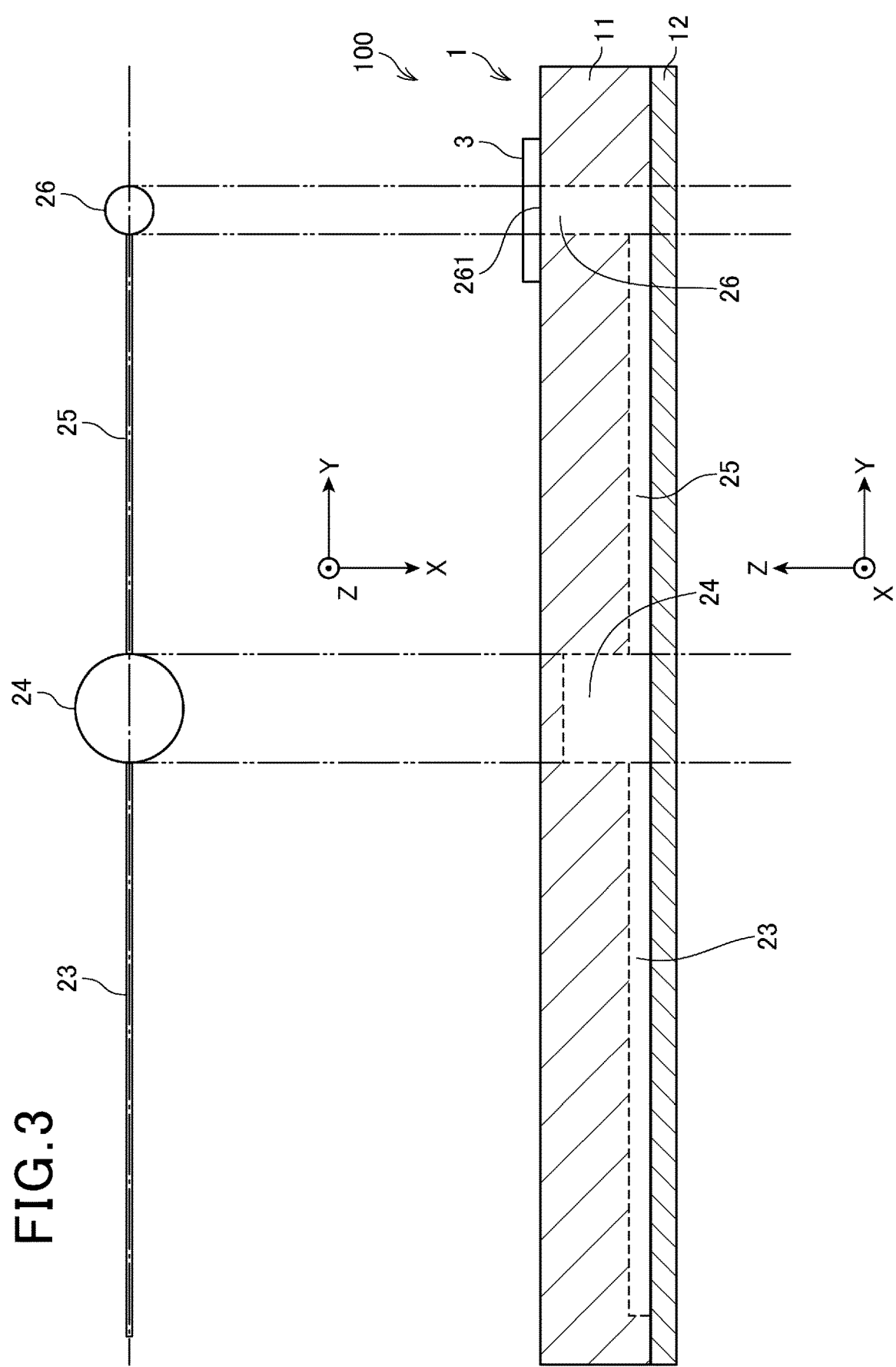
FIG. 3 is a sectional view illustrating the example of the micro flow path device according to the first embodiment as taken along line III-III.

FIG. 3 is a sectional view illustrating the example of the micro flow path device 100 according to the first embodiment as taken along line III-III. The upper portion in FIG. 3 is a plan view of a position corresponding to the III-III cross section of the micro flow path device 100, and the lower portion in FIG. 3 is the III-III cross section of the micro flow path device 100. The position of the III-III cross section is indicated by an alternate long and short dash line in FIG. 1.

As illustrated in FIG. 3, the micro flow path 23 extends along the Y-axis direction. The micro flow path 23 is formed between the first plate-shaped member 11 and the second plate-shaped member 12. Specifically, a recess corresponding to the micro flow path 23 is formed in the first plate-shaped member 11, and the opening on the lower surface of the recess is covered with the second plate-shaped member 12, whereby the micro flow path 23 is formed.

The storage unit 24 is formed in a columnar shape. The storage unit 24 is formed between the first plate-shaped member 11 and the second plate-shaped member 12. Specifically, a columnar recess corresponding to the storage unit 24 is formed in the first plate-shaped member 11, and the opening on the lower surface of the recess is covered with the second plate-shaped member 12, whereby the storage unit 24 is formed.

The micro flow path 25 extends along the Y-axis direction. The micro flow path 25 is formed between the first plate-shaped member 11 and the second plate-shaped member 12. Specifically, a recess corresponding to the micro flow path 25 is formed in the first plate-shaped member 11, and the opening on the lower surface of the recess is covered with the second plate-shaped member 12, whereby the micro flow path 25 is formed.

The opening 26 is formed at the end of the micro flow path 25 on the positive direction side of the Y axis. The opening 26 is formed in a circular shape in the first plate-shaped member 11. The opening 26 and the micro flow path 25 are formed to communicate with each other. That is, the first plate-shaped member 11 is formed with a flow path which allows the end of the micro flow path 25 on the positive direction side of the Y axis and the opening 26 to communicate with each other. The flow path extends in the Z-axis direction and is formed in a columnar shape.

The gas-permeable membrane 3 covers the opening 26. Specifically, the gas-permeable membrane 3 is fixed to the surface (upper surface) of the first plate-shaped member 11 on the positive direction side of the Z axis so as to cover the opening 26.

[2. Configuration of Testing Apparatus]

Figure 4:
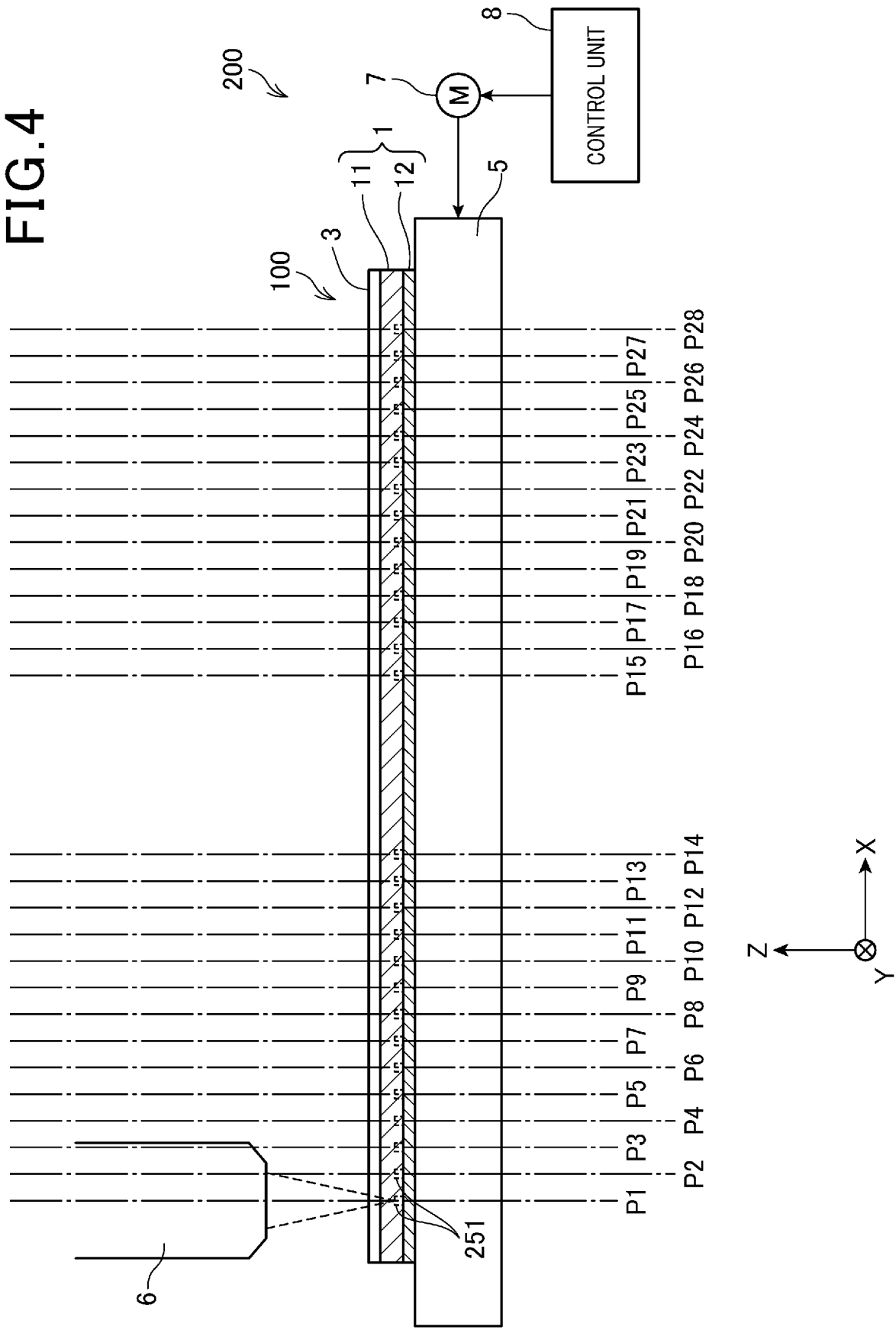
FIG. 4 is a sectional view illustrating the example of the micro flow path device according to the first embodiment as taken along line IV-IV.

FIG. 4 is a diagram illustrating a configuration of a testing apparatus 200. Further, FIG. 4 is a sectional view illustrating the example of the micro flow path device 100 according to the first embodiment as taken along line IV-IV. The position of the IV-IV cross section is indicated by an alternate long and short dash line in FIG. 1.

As illustrated in FIG. 4, 28 flow paths 251 are included in the IV-IV cross section. The flow path 251 indicates the micro flow path 25 included in imaging target region AR illustrated in FIG. 1. Each of the 28 flow paths 251 is formed between the first plate-shaped member 11 and the second plate-shaped member 12.

The testing apparatus 200 includes a table 5, a microscope 6, a motor 71, and a control unit 8. The motor 71 corresponds to a part of the "drive mechanism".

The micro flow path device 100 is placed on the table 5. The table 5 is formed in a flat plate shape. The micro flow path device 100 is fixed to the upper surface of the table 5. The table 5 is configured to be movable in the horizontal direction. Specifically, the table 5 is configured to be movable along the X-axis direction and movable along the Y-axis direction.

A light source is disposed below the table 5. The light source is disposed at a position facing the microscope 6. The table 5 is formed to transmit a light beam from the light source to the microscope 6. For example, an opening through which a light beam is transmitted from the light source to the microscope 6 is formed in the table 5. For example, the table 5 is made of a transparent material. Specifically, the table 5 is made of glass.

The motor 71 drives the table 5 in accordance with an instruction from the control unit 8. Specifically, the motor 71 drives the table 5 such that the flow path 251 is positioned in the imaging region of the microscope 6. More specifically, the motor 71 drives the table 5 such that each of the 28 flow paths 251 is positioned in the imaging region of the microscope 6. The 28 flow paths 251 are positioned at respective positions P1 to P28. That is, the motor 71 drives the table 5 along the X-axis direction such that the imaging region of the microscope 6 is positioned at each of the positions P1 to P28.

The control unit 8 controls the operation of the testing apparatus 200. The control unit 8 includes a processor such as a central processing unit (CPU) and memories such as a read only memory (ROM) and a random access memory (RAM). The memory stores a control program. The processor controls the operation of the testing apparatus 200 by executing the control program. Incidentally, the memory of the control unit 8 may include a hard disk drive (HDD).

The control unit 8 causes the motor 71 to drive the table 5 such that the flow path 251 is positioned in the imaging region of the microscope 6. Further, the control unit 8 causes the microscope 6 to image the flow path 251 when the flow path 251 is positioned in the imaging region of the microscope 6. Further, the control unit 8 stores image data formed by imaging by the microscope 6 in the memory.

Specifically, the control unit 8 causes the motor 71 to drive the table 5 such that the position P1 is positioned in the imaging region of the microscope 6. Then, the control unit 8 causes the microscope 6 to image the flow path 251 in a state where the position P1 is positioned in the imaging region of the microscope 6. Next, the control unit 8 causes the motor 71 to drive the table 5 such that the position P2 is positioned in the imaging region of the microscope 6. That is, the control unit 8 causes the motor 71 to drive the table 5 such that the table 5 is moved in the negative direction of the X axis, and the position P2 is positioned in the imaging region of the microscope 6. Then, the control unit 8 causes the microscope 6 to image the flow path 251 in a state where the position P2 is positioned in the imaging region of the microscope 6.

In this manner, by alternately and repeatedly executing the movement of the table 5 in the negative direction of the X axis and the imaging of the flow path 251 by the microscope 6, the control unit 8 causes the microscope 6 to image the flow path 251 at each of the positions P1 to P28.

Figure 5:
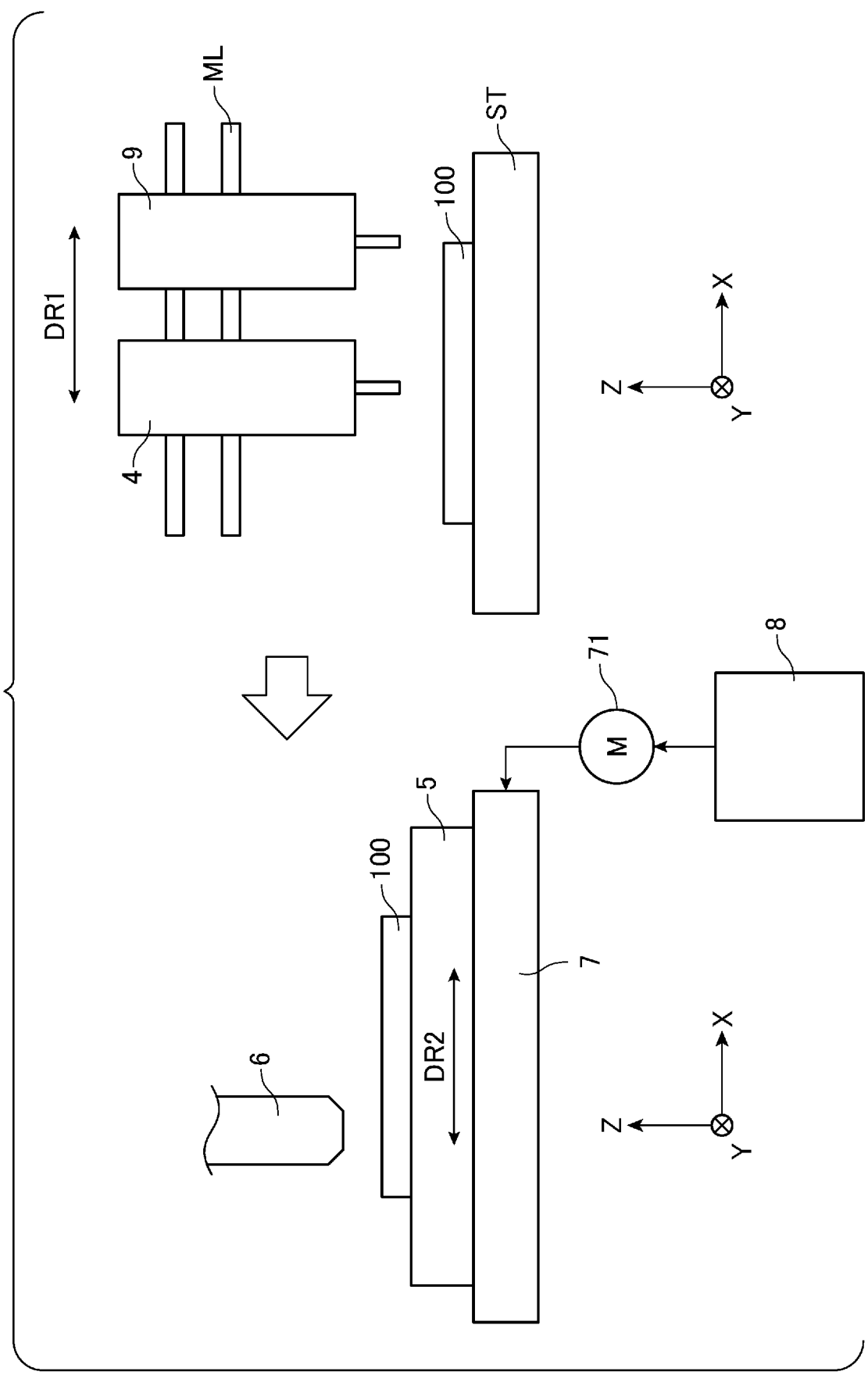
FIG. 5 is a diagram illustrating an example of a configuration of a testing apparatus.

FIG. 5 is a diagram illustrating an example of an overall configuration of the testing apparatus 200.

As illustrated in the right portion of FIG. 5, the testing apparatus 200 includes a dispensing stage ST, a dispenser 9, a pump 4, and a moving mechanism ML.

The micro flow path device 100 is placed on the dispensing stage ST. The dispenser 9 injects a test liquid into the micro flow path device 100. Specifically, the dispenser 9 stores the test liquid, and injects a predetermined amount of the test liquid through the opening 21 of the micro flow path device 100.

Thereafter, the gas-permeable membrane 3 is attached to the opening 26 of the micro flow path device 100. Then, the pump 4 is disposed above the micro flow path device 100 by the moving mechanism ML. The moving mechanism ML supports the pump 4 and the dispenser 9 and is configured to be movable in a right-left direction DR1. The right-left direction DR1 indicates the X-axis direction.

Then, the pump 4 applies air pressure to the test liquid through the opening 26 until the test liquid reaches the opening 21.

Thereafter, as illustrated in the left portion of FIG. 5, the micro flow path device 100 is placed on the table 5. As illustrated in the left portion of FIG. 5, the testing apparatus 200 includes a drive mechanism 7 and the control unit 8. The drive mechanism 7 includes a motor 71. The motor 71 drives the drive mechanism 7 to drive the table 5 in a right-left direction DR2. The right-left direction DR2 indicates the X-axis direction. A specific method of moving the table 5 has been described with reference to FIG. 4.

Incidentally, the testing apparatus 200 may include a conveyance unit. The conveyance unit moves the micro flow path device 100 placed on the dispensing stage ST to the table 5.

Further, the testing apparatus 200 may include an incubator. The incubator keeps the micro flow path device 100 warm. In this case, the bacteria contained in the test liquid and the antibacterial drug can be caused to react with each other at a desired temperature. Further, the conveyance unit is preferably configured to be able to convey the micro flow path device 100 between the inside of the incubator and the dispensing stage ST and the table 5.

[3. Processing of Control Unit]

Figure 6:
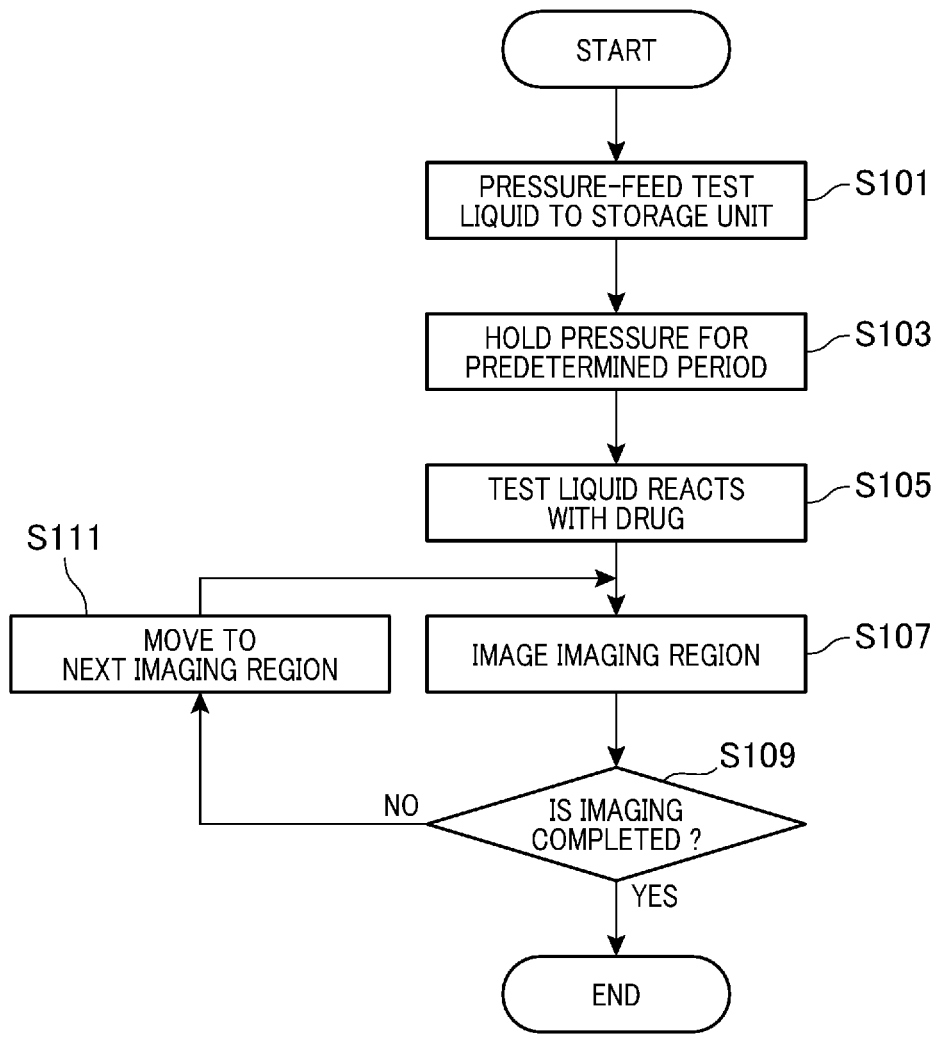
FIG. 6 is a flowchart illustrating an example of processing of a control unit of the testing apparatus.

FIG. 6 is a flowchart illustrating an example of processing of the control unit 8 of the testing apparatus 200.

The control unit 8 controls the operation of the syringe pump 4 illustrated in FIG. 2. A motor which drives the syringe pump 4 is connected to the syringe pump 4. The control unit 8 controls the operation of the syringe pump 4 via the motor. Incidentally, a case where the position P1 illustrated in FIG. 4 is positioned in the imaging region of the microscope 6 in an initial state will be described.

First, in step S101, the micro flow path device 100 is prepared, and the control unit 8 causes the syringe pump 4 to pressure-feed the test liquid to the storage unit 24. Specifically, the control unit 8 controls the syringe pump 4 such that the micro flow path 23, the storage unit 24, and the micro flow path 25 are filled with the test liquid.

Next, in step S103, the control unit 8 controls the syringe pump 4 so as to hold the application of the pressure to the test liquid for a predetermined period. Specifically, the control unit 8 controls the syringe pump 4 so as to apply air pressure to the test liquid for a predetermined period. The predetermined period is, for example, one minute.

Next, in step S105, the test liquid and the drug disposed in the storage unit 24 react with each other.

Next, in step S107, the control unit 8 causes the microscope 6 to image the flow path 251. Further, the control unit 8 stores image data formed by imaging by the microscope 6 in the memory.

Next, in step S109, the control unit 8 determines whether or not imaging of all the flow paths 251 is completed.

When the control unit 8 determines that the imaging of all the flow paths 251 is completed (step S109: YES), the process ends. When the control unit 8 determines that the imaging of all the flow paths 251 is not completed (step S109: NO), the process proceeds to step S111.

Then, in step S111, the control unit 8 moves the table 5 so as to image the next flow path 251.

Specifically, the control unit 8 causes the motor 71 to move the table 5 such that the next flow path 251 enters the imaging region of the microscope 6. Then, the process returns to step S107.

Step S101 corresponds to an example of the "preparation process" and the "pressure feeding process", and step S103 corresponds to an example of the "holding process". Step S105 corresponds to an example of the "reaction process", and step S107 corresponds to an example of the "observation process".

[3. Effects of Micro Flow Path Device, Testing Apparatus, and Testing Method According to First Embodiment]

[3-1. Effect of Testing Method Using Micro Flow Path Device]

In step S101, the control unit 8 causes the syringe pump 4 to pressure-feed the test liquid to the storage unit 24. Further, in step S103, the control unit 8 controls the syringe pump 4 so as to hold the application of the pressure to the test liquid for a predetermined period.

The air contained in the test liquid stored in the storage unit 24 permeates through the opening 26 formed in communication with the storage unit 24 and the gas-permeable membrane 3 to be released, and the test liquid does not permeate through the gas-permeable membrane 3. Therefore, the storage unit 24 is filled with the test liquid. As a result, an appropriate amount of the test liquid can be easily stored in the storage unit 24.

In step S103, the control unit 8 controls the syringe pump 4 so as to apply air pressure to the test liquid for a predetermined period.

Thus, air pressure is applied to the test liquid in the micro flow path 22 or the micro flow path 23 for the predetermined period. Therefore, pressure can be easily applied to the test liquid stored in the storage unit 24. As a result, the test liquid can be easily held in the imaging target region AR.

The test liquid is a bacterial liquid, and the drug is an antibacterial drug.

Therefore, the effect of the antibacterial drug on the bacterial liquid can be efficiently verified.

[3-2. Effect of Micro Flow Path Device]

The micro flow path device 100 includes the micro flow path 23 through which a test liquid can flow, the storage unit 24 in which a drug is disposed and which stores the test liquid flowing in through the micro flow path 23, the opening 26 formed in communication with the storage unit 24, and the gas-permeable membrane 3 covering the opening 26.

Thus, when the test liquid flows into the storage unit 24 through the micro flow path 23 and the storage unit 24 is filled with the test liquid, the outflow of the test liquid through the opening 26 is restricted by the gas-permeable membrane 3. Therefore, the storage unit 24 is filled with the test liquid. As a result, an appropriate amount of the test liquid can be easily stored in the storage unit 24.

The micro flow path 25 which allows the storage unit 24 and the opening 26 to communicate each other and the test liquid to flow therethrough is provided, and the imaging target region AR imaged by the microscope 6 is disposed in the micro flow path 25.

Thus, the air contained in the test liquid flowing into the micro flow path 25 permeates through the gas-permeable membrane 3 and the opening 26 to be released, and the test liquid does not permeate through the gas-permeable membrane 3. Therefore, the air contained in the test liquid in the micro flow path 25 can be removed, and thus the test liquid can be clearly imaged in the imaging target region AR disposed in the micro flow path 25.

The first plate-shaped member 11 and the second plate-shaped member 12 stacked on the first plate-shaped member 11 are provided, the micro flow path 25 is formed at a boundary between the first plate-shaped member 11 and the second plate-shaped member 12, and the first plate-shaped member 11 and the second plate-shaped member 12 forming the micro flow path 25 are transparent.

Thus, the light beam emitted from the light source permeates through the first plate-shaped member 11 and the second plate-shaped member 12 and reaches the microscope 6. Therefore, the test liquid can be clearly imaged.

A plurality of micro flow paths 23, a plurality of storage units 24 respectively connected to the plurality of micro flow paths 23, and a plurality of micro flow paths 25 respectively connected to the plurality of storage units 24 are provided, and the plurality of micro flow paths 25 are formed close to each other.

Thus, since the plurality of micro flow paths 25 are formed close to each other, it is possible to reduce the movement distance of the table 5 on which the micro flow path device 100 is placed when images of the plurality of micro flow paths 25 are captured. Therefore, the test liquid in each of the plurality of micro flow paths 25 can be efficiently imaged.

The second opening 21 formed in the micro flow path 22 is provided, and the syringe pump 4 which applies air pressure to the test liquid is connected to the second opening 21.

Thus, the test liquid in the micro flow path 22 can be easily caused to flow. Further, when the gas-permeable membrane 3 is fixed to the second plate-shaped member 12 so as to withstand the applied air pressure, it is possible to suppress the test liquid from flowing out through the opening 26. Therefore, an appropriate amount of the test liquid can be easily stored in the storage unit 24.

[3-3. Effect of Testing Apparatus Including Micro Flow Path Device]

The testing apparatus 200 includes the micro flow path device 100, the table 5 on which the micro flow path device 100 is placed, the motor 71 which drives the table 5 along the horizontal direction, and the control unit 8 which controls the motor 71. The control unit 8 causes the motor 71 to drive the table 5 such that the micro flow path 25 is positioned in the imaging region of the microscope.

Therefore, since the testing apparatus 200 includes the micro flow path device 100, an appropriate amount of test liquid can be easily stored in the storage unit 24. Further, since the control unit 8 causes the motor 71 to drive the table 5 such that the micro flow path 25 is positioned in the imaging region of the microscope, the test liquid in the micro flow path 25 can be efficiently imaged.

The micro flow path device 100 includes the plurality of micro flow paths 25, and the control unit 8 causes the motor 71 to drive the table 5 such that each of the plurality of micro flow paths 25 is positioned in the imaging region of the microscope 6.

Therefore, each test liquid in the plurality of micro flow paths 25 can be efficiently imaged.

[4. Other Embodiments of Micro Flow Path Device]

In the micro flow path device 100 according to the first embodiment, the imaging target region AR imaged by the microscope 6 is disposed in the micro flow path 25, but the content of the embodiment of the present invention is not limited thereto. The imaging target region AR may be disposed in the micro flow path 23.

Although the first plate-shaped member 11 and the second plate-shaped member 12 are transparent, the content of the embodiment of the present invention is not limited thereto. A part of the first plate-shaped member 11 and a part of the second plate-shaped member 12 forming the micro flow path 25 may be transparent. In other words, a part of the first plate-shaped member 11 and a part of the second plate-shaped member 12 corresponding to the imaging target region AR may be transparent.

28 openings 26 are covered with one gas-permeable membrane 3, but the content of the embodiment of the present invention is not limited thereto. Each opening 26 may be covered with one gas-permeable membrane 3, or a plurality of (for example, two) openings 26 may be covered with one gas-permeable membrane 3.

Although the syringe pump 4 applies air pressure to the test liquid, the content of the embodiment of the present invention is not limited thereto. The pump may apply air pressure to the test liquid. The pump may be a plunger pump or a diaphragm pump.

Although 56 storage units 24 are formed in the micro flow path device 100, the number thereof may be one or two or more.

The micro flow path 22 of the flow path structure 2 is branched into 14 micro flow paths 23, but the micro flow path 22 may be connected to at least one micro flow path 23. That is, the micro flow path 22 may be connected with one micro flow path 23, or the micro flow path 22 may be branched into two or more micro flow paths 23.

Although the micro flow path 22, the micro flow path 23, the storage unit 24, and the micro flow path 25 are formed in the first plate-shaped member 11, the micro flow path 22, the micro flow path 23, the storage unit 24, and the micro flow path 25 may be formed in the second plate-shaped member 12.

Incidentally, the micro flow path device 100 according to the first embodiment is merely an example of an aspect of the micro flow path device 100 according to the present invention, and can be arbitrarily modified and applied without departing from the gist of the present invention.

[5. Configuration of Micro Flow Path Device According to Second Embodiment]

Figure 7:
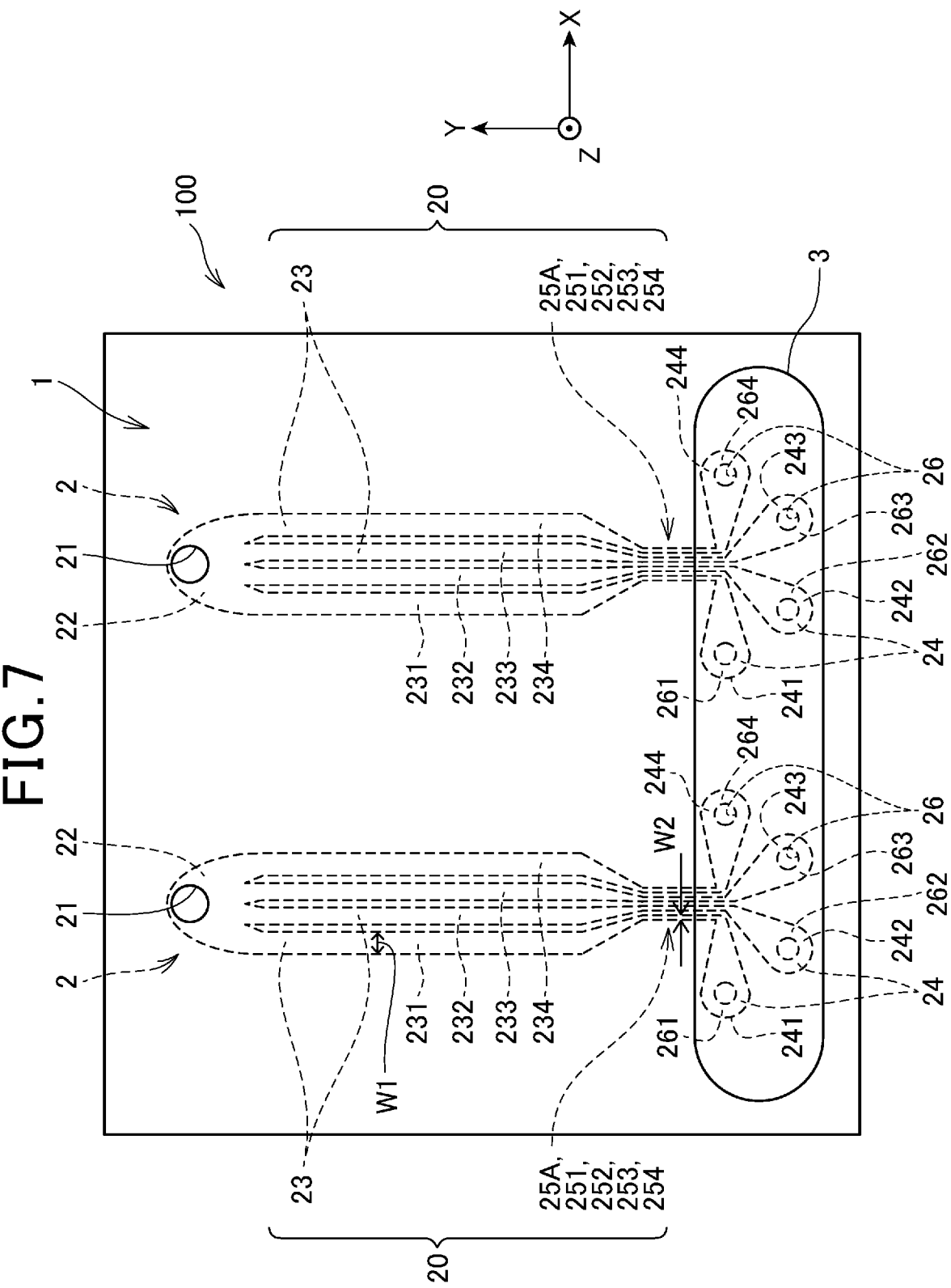
FIG. 7 is a plan view illustrating an example of a micro flow path device according to a second embodiment of the present invention.

FIG. 7 is a plan view illustrating an example of the micro flow path device 100 according to a second embodiment of the present invention. The micro flow path device 100 is placed on the table 5 of the testing apparatus 200 illustrated in FIG. 4.

As illustrated in FIG. 7, the micro flow path device 100 includes the plate-shaped member 1, the flow path structure 2, and the gas-permeable membrane 3. In the micro flow path device 100, two flow path structures 2 are formed in the plate-shaped member 1.

The flow path structure 2 includes the opening 21, the micro flow path 22, the micro flow path 23, the micro flow path 25A, the storage unit 24, and the opening 26.

The opening 21 corresponds to an example of the "second opening". The micro flow path 22, the micro flow path 23, and the micro flow path 25A correspond to an example of the "first micro flow path". The opening 26 corresponds to an example of the "first opening". The micro flow path 23 corresponds to an example of the "second flow path". The micro flow path 25A corresponds to an example of the "first flow path".

The opening 21 is disposed at one end of the micro flow path 22. Through the opening 21, the test liquid is pressed into the micro flow path 22. The opening 21 has, for example, a circular cross section. The diameter of the opening 21 is, for example, 5 μm to 5 mm. The micro flow path 22 is connected to the opening 21.

The test liquid is, for example, a bacterial liquid. Specifically, the test liquid is a suspension of bacteria. The micro flow path 22 is configured to allow the test liquid to flow therethrough. One end of the micro flow path 22 is connected to the opening 21, and the other end of the micro flow path 22 is connected to the micro flow path 23.

One end of the micro flow path 23 is connected to the micro flow path 22, and the other end of the micro flow path 23 is connected to the micro flow path 25A. The micro flow path 23 corresponds to an example of the "second flow path". The micro flow path 23 includes a micro flow path 231, a micro flow path 232, a micro flow path 233, and a micro flow path 234.

Each of the micro flow path 231 to the micro flow path 234 is formed along the Y-axis direction. The end of each of the micro flow path 231 to the micro flow path 234 in the positive direction (upward direction) of the Y axis is connected to the micro flow path 22, and the end of each of the micro flow path 231 to the micro flow path 234 in the negative direction (downward direction) of the Y axis is connected to the micro flow path 25A. Each of the micro flow path 231 to the micro flow path 234 has a rectangular cross section. A width W1 of each of the micro flow path 231 to the micro flow path 234 is, for example, 1 μm to 1 mm.

One end of the micro flow path 25A is connected to the micro flow path 23, and the other end of the micro flow path 25A is connected to the storage unit 24. The micro flow path 25A is imaged by a microscope. In other words, the micro flow path 25A corresponds to an example of the "first flow path". The micro flow path 25A includes the micro flow path 251, a micro flow path 252, a micro flow path 253, and a micro flow path 254.

Each of the micro flow path 251 to the micro flow path 254 is formed along the Y-axis direction. The ends of the micro flow path 251 to the micro flow path 254 in the positive direction (upward direction) of the Y axis respectively are connected to the micro flow path 231 to the micro flow path 234. That is, the micro flow path 251 is connected to the micro flow path 231, and the micro flow path 252 is connected to the micro flow path 232. Further, the micro flow path 253 is connected to the micro flow path 233, and the micro flow path 254 is connected to the micro flow path 234.

Each of the micro flow path 251 to the micro flow path 254 has a rectangular cross section. A width W2 of each of the micro flow path 251 to the micro flow path 254 is, for example, 0.1 μm to 0.1 mm.

The ends of the micro flow paths 231 to 234 on the negative direction side (lower side) of the Y axis are connected to the storage unit 24. The micro flow path 251 to the micro flow path 254 are disposed so as to be close to each other.

The storage unit 24 is disposed with a drug, and is connected to the micro flow path 25A to store the test liquid flowing in through the micro flow path 25A. In the storage unit 24, the test liquid reacts with the drug. The drug is, for example, an antibacterial drug. The drug may be a solid or a liquid. The drug is placed on the storage unit 24 in advance. That is, before the test liquid flows into the storage unit 24, the drug is placed on the storage unit 24.

The storage unit 24 includes a storage unit 241, a storage unit 242, a storage unit 243, and a storage unit 244. The test liquid flows into the storage unit 241 through the micro flow path 251. The test liquid flows into the storage unit 242 through the micro flow path 252. The test liquid flows into the storage unit 243 through the micro flow path 253. The test liquid flows into the storage unit 244 through the micro flow path 254.

The opening 26 is formed at the end of the storage unit 24 in the positive direction (upward direction) of the Z axis. The opening 26 includes an opening 261, an opening 262, an opening 263, and an opening 264. The opening 261 is formed at the upper end of the storage unit 241, and the opening 262 is formed at the upper end of the storage unit 242. The opening 263 is formed at the upper end of the storage unit 243, and the opening 264 is formed at the upper end of the storage unit 244.

Each of the openings 261 to 264 is formed to have a circular cross section, for example. The diameter of each of the openings 261 to 264 is, for example, 5 μm to 5 mm.

The opening 26 is covered with the gas-permeable membrane 3. Specifically, in FIG. 7, eight (=4×2) openings (openings 261 to 264) are formed in the plate-shaped member 1. The eight openings are covered with one gas-permeable membrane 3. One gas-permeable membrane 3 is disposed along the X-axis direction.

The gas-permeable membrane 3 is made of a material having high gas permeability and low liquid permeability. A person skilled in the art assumes a plurality of candidates as a material having the property. In the embodiment of the present invention, the gas-permeable membrane 3 is made of polytetrafluoroethylene (PTFE). The gas-permeable membrane 3 preferably has water repellency. The thickness of the gas-permeable membrane 3 is 1 mm or less.

The gas-permeable membrane 3 is fixed to the plate-shaped member 1 by adhesion using an adhesive, ultrasonic fusion, or the like. Examples of the adhesive include a photocurable resin, a thermosetting resin, and a pressure sensitive resin.

Figure 8:
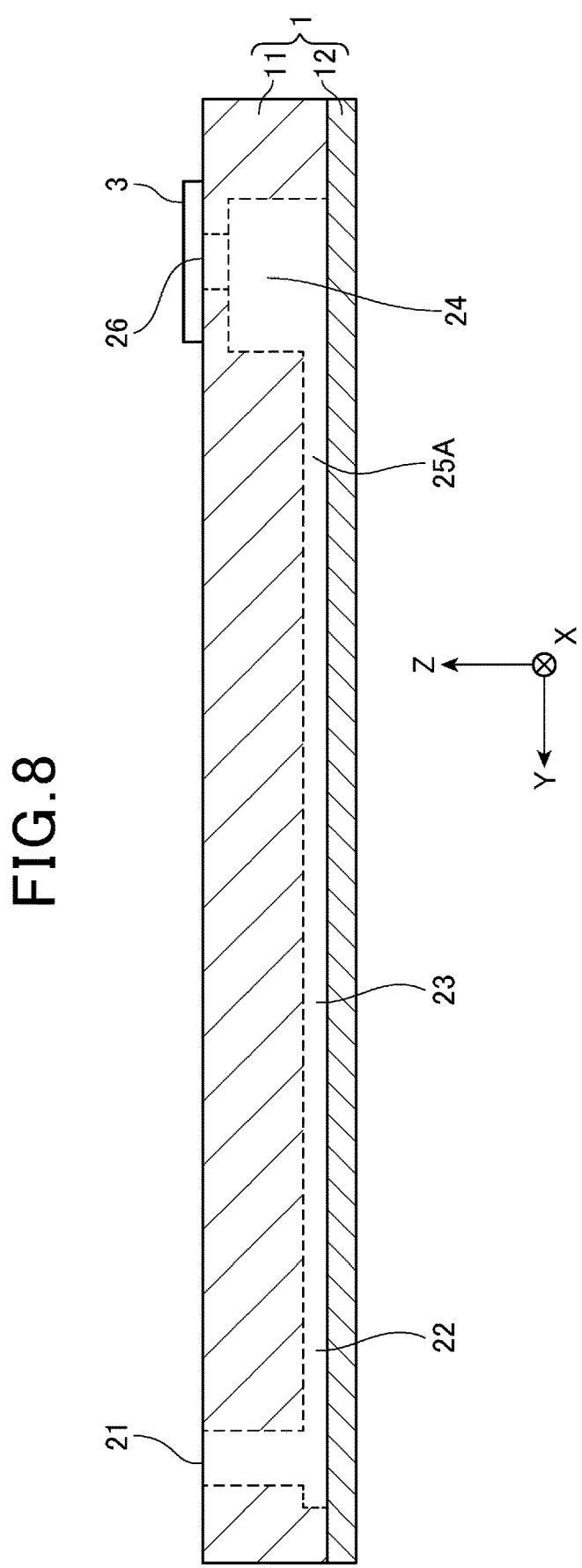
FIG. 8 is a side sectional view illustrating the example of the micro flow path device according to the second embodiment.

FIG. 8 is a side sectional view illustrating the example of the micro flow path device 100 according to the second embodiment.

As illustrated in FIG. 8, the plate-shaped member 1 includes the first plate-shaped member 11 and the second plate-shaped member 12. The second plate-shaped member 12 is stacked on the first plate-shaped member 11.

The first plate-shaped member 11 is formed in a rectangular plate shape using a transparent material. Examples of the material of the first plate-shaped member 11 include an acrylic resin such as a polymethyl methacrylate resin. The flow path structure 2 is formed in the first plate-shaped member 11. Specifically, the opening 21, the micro flow path 22, the micro flow path 25A, the storage unit 24, and the opening 26 are formed in the first plate-shaped member 11.

The opening 21 is formed in a circular shape in the first plate-shaped member 11. The opening 21 and the micro flow path 22 are formed to communicate with each other. That is, the first plate-shaped member 11 is formed with a flow path which allows the end of the micro flow path 22 on the positive direction side of the Y axis with the opening 21 to communicate with each other. The flow path extends in the Z-axis direction and is formed in a columnar shape.

The thickness of the first plate-shaped member 11 is not particularly limited, and is set to, for example, 0.5 mm to 3 mm.

The second plate-shaped member 12 is formed in a rectangular plate shape using a transparent material. Examples of the material of the second plate-shaped member 12 include an acrylic resin such as a polymethyl methacrylate resin. The second plate-shaped member 12 functions as a part of the flow path structure 2. Specifically, the second plate-shaped member 12 functions as the lower surface of the micro flow path 22, the micro flow path 25A, and the storage unit 24.

The thickness of the second plate-shaped member 12 is not particularly limited, but is set to, for example, 0.5 mm to 3 mm.

The second plate-shaped member 12 is directly fixed to the first plate-shaped member 11 by ultrasonic melting, but may be fixed via an adhesive. In the second embodiment, a case where the second plate-shaped member 12 is made of acrylic resin is described, but the second plate-shaped member 12 may be made of glass.

The syringe pump 4 (not illustrated) is connected to the opening 21. The syringe pump 4 presses the test liquid into the micro flow path 22 through the opening 21. Specifically, the syringe pump 4 applies air pressure to the test liquid to press the test liquid into the micro flow path 22 through the opening 21.

The syringe pump 4 corresponds to an example of the "pump".

The test liquid flowing into the micro flow path 22 is stored in the storage unit 24 via the micro flow path 23 and the micro flow path 25A. Further, when the syringe pump 4 applies air pressure to the test liquid, air contained in the test liquid is discharged to the outside of the micro flow path device 100 via the opening 26 and the gas-permeable membrane 3. In this manner, the storage unit 24 is filled with the test liquid.

[6. Captured Image of Micro Flow Path Device According to Second Embodiment]

The testing apparatus 200 for imaging the micro flow path device 100 according to the second embodiment has the same configuration as the testing apparatus 200 described with reference to FIG. 4.

That is, the testing apparatus 200 includes the table 5, the microscope 6, the motor 71, and the control unit 8. Hereinafter, points different from the testing apparatus 200 described with reference to FIG. 4 will be described, and the description of the same configuration as the testing apparatus 200 described with reference to FIG. 4 will be omitted.

In accordance with an instruction from the control unit 8, the testing apparatus 200 images the micro flow path 25A and generates an image. Specifically, in accordance with the instruction from the control unit 8, the testing apparatus 200 images each of the two micro flow paths 25A formed in the micro flow path device 100, generates an image, and stores image data in the memory.

For example, the microscope 6 first images the micro flow path 25A in the negative direction (the left direction in FIG. 7) of the X axis among the two micro flow paths 25A formed in the micro flow path device 100, and generates an image.

Next, in accordance with an instruction from the control unit 8, the motor 71 moves the table 5 in the negative direction (the left direction in FIG. 7) of the X axis such that the micro flow path 25A in the positive direction (the right direction in FIG. 7) of the X axis among the two micro flow paths 25A enters the imaging region of the microscope 6.

Then, in accordance with an instruction from the control unit 8, the microscope 6 images the micro flow path 25A in the positive direction of the X axis and generates an image.

FIG. 9 is a view illustrating an example of a captured image FV of the micro flow path device 100 according to the second embodiment.

As illustrated in FIG. 9, the captured image FV includes images of the micro flow path 251 to the micro flow path 254.

Since the width W2 of each of the micro flow path 251 to the micro flow path 254 is narrow, and the micro flow path 251 to the micro flow path 254 are disposed so as to be close to each other, the micro flow path 251 to the micro flow path 254 can be included in one captured image FV.

[7. Effects of Micro Flow Path Device According to Second Embodiment]

In the micro flow path device 100 according to the second embodiment, the opening 26 is formed in the storage unit 24. Further, the opening 26 is covered with the gas-permeable membrane 3.

Thus, when the test liquid flows into the storage unit 24 through the micro flow path 23 and the storage unit 24 is filled with the test liquid, the outflow of the test liquid through the opening 26 is restricted by the gas-permeable membrane 3. Therefore, the storage unit 24 is filled with the test liquid. As a result, an appropriate amount of the test liquid can be easily stored in the storage unit 24.

The air contained in the test liquid stored in the micro flow path 25A and the storage unit 24 is discharged to the outside of the micro flow path device 100 via the opening 26 and the gas-permeable membrane 3. Therefore, the air contained in the test liquid in the micro flow path 25A can be removed, and thus the test liquid in the micro flow path 25A can be clearly imaged.

The opening 21 formed in the micro flow path 22 and the syringe pump 4 which applies air pressure to the test liquid through the opening 21 are provided.

Thus, the test liquid in the micro flow path 23 can be easily caused to flow. Further, when the gas-permeable membrane 3 is fixed to the second plate-shaped member 12 so as to withstand the applied air pressure, it is possible to suppress the test liquid from flowing out through the opening 26. Therefore, an appropriate amount of the test liquid can be easily stored in the storage unit 24.

The micro flow path 25A to be imaged by a microscope and the micro flow path 23 connected to the micro flow path 25A are provided, and the micro flow path 25A is formed to have a narrower horizontal width W2 than the micro flow path 23.

Therefore, the micro flow path 25A can be included in the captured image FV at a high magnification (for example, 100 times).

A plurality of micro flow paths 25A (micro flow paths 251 to 254) and a plurality of micro flow paths 23 are provided, and the plurality of micro flow paths 25A are formed close to each other.

Therefore, the micro flow path 251 to the micro flow path 254 can be included in one captured image FV.

The first plate-shaped member 11 and the second plate-shaped member 12 stacked on the first plate-shaped member 11 are provided, the micro flow path 25 is formed at a boundary between the first plate-shaped member 11 and the second plate-shaped member 12, and the first plate-shaped member 11 and the second plate-shaped member 12 forming the micro flow path 25 are transparent.

Thus, the light beam emitted from the light source permeates through the first plate-shaped member 11 and the second plate-shaped member 12 and reaches the microscope 6. Therefore, the test liquid in the micro flow path 25A can be clearly imaged.

[8. Other Embodiments of Micro Flow Path Device]

In the micro flow path device 100 according to the second embodiment, the opening 26 is formed in the storage unit 24, but the content of the embodiment of the present invention is not limited thereto. It is sufficient if the opening 26 is formed to communicate with the storage unit 24.

Although the first plate-shaped member 11 and the second plate-shaped member 12 are transparent, the content of the embodiment of the present invention is not limited thereto. A part of the first plate-shaped member 11 and a part of the second plate-shaped member 12 forming the micro flow path 25A may be transparent.

The bacterial liquid is used as the test liquid, but a chemical liquid such as a paint may be used as the test liquid. In this case, it is preferable to change the type of the drug to be disposed in the storage unit 24 according to the type of the test liquid.

Four openings 26 are covered with one gas-permeable membrane 3, but the content of the embodiment of the present invention is not limited thereto. Each opening 26 may be covered with one gas-permeable membrane 3, or a plurality of (for example, two) openings 26 may be covered with one gas-permeable membrane 3.

Although the syringe pump 4 applies air pressure to the test liquid, the content of the embodiment of the present invention is not limited thereto. The pump may apply air pressure to the test liquid. The pump may be a plunger pump or a diaphragm pump.

Two flow path structures 2 are formed in the micro flow path device 100, but the number of flow path structures 2 may be one or three or more.

The micro flow path 25A of the flow path structure 2 includes the four micro flow paths 251 to 254, but the micro flow path 25A may include at least one micro flow path. That is, the micro flow path 25A may include one micro flow path, or may include two or three micro flow paths. Further, the micro flow path 25A may include five or more micro flow paths.

The micro flow path 22, the micro flow path 23, the micro flow path 25A, and the storage unit 24 are formed in the first plate-shaped member 11 but may be formed in the second plate-shaped member 12.

Incidentally, the second embodiment is merely an example of an aspect of the micro flow path device 100 according to the present invention, and can be arbitrarily modified and applied without departing from the gist of the present invention.

[9. Aspects]

It is understood by those skilled in the art that the above-described embodiment is a specific example of the following aspects.

(Item 1)

A testing method using a micro flow path device according to an aspect is a testing method in which the device is configured for a test liquid containing a specimen to be brought into contact with a drug therein and for a test on an action of the drug on the specimen, the method including: preparing a micro flow path device which includes a plurality of micro flow paths, a first opening and a second opening which are disposed at both ends of each of the plurality of micro flow paths and communicate with an outside, a storage unit which is provided in each of the plurality of micro flow paths and stores the drug, and a gas-permeable membrane which covers the first opening; applying a fluid pressure higher than an external pressure to the test liquid through the second opening from a pressure source connected to the second opening to pressure-feed the test liquid to the storage unit; and observing a target region set in the micro flow path.

According to the testing method using the micro flow path device described in item 1, the first opening formed in communication with the storage unit in the micro flow path device is covered with the gas-permeable membrane, and the method includes applying the fluid pressure higher than the external pressure to the test liquid to pressure-feed the test liquid to the storage unit.

Thus, the air contained in the test liquid stored in the storage unit permeates through the opening formed in communication with the storage unit and the gas-permeable membrane to be released, and the test liquid does not permeate through the gas-permeable membrane. Therefore, the storage unit is filled with the test liquid, and an appropriate amount of the test liquid can be easily stored in the storage unit. As a result, the concentration after the drug is dissolved in the test liquid can be stabilized.

(Item 2)

The testing method according to item 1 further includes: holding a state for a predetermined period in which the fluid pressure to the test liquid is applied.

According to the testing method using the micro flow path device described in item 2, in the holding, a state for a predetermined period in which the fluid pressure to the test liquid is applied is held. Therefore, the storage unit is filled with the test liquid, and a more appropriate amount of the test liquid can be stored in the storage unit. As a result, the concentration after the drug is dissolved in the test liquid can be further stabilized.

(Item 3)

In the testing method using the micro flow path device according to item 1 or 2, the holding includes applying air pressure to the test liquid.

According to the testing method using the micro flow path device described in item 3, in the holding, the air pressure to the test liquid is applied. Thus, an appropriate pressure can be applied to the test liquid. Therefore, the storage unit is filled with the test liquid, and a more appropriate amount of the test liquid can be stored in the storage unit. As a result, the concentration after the drug is dissolved in the test liquid can be further stabilized.

(Item 4)

In the testing method according to any one of items 1 to 3, the test liquid is a bacterial liquid, and the drug is an antibacterial drug.

According to the testing method using the micro flow path device described in item 4, the test liquid is a bacterial liquid, and the drug is an antibacterial drug. Therefore, the concentration after the antibacterial drug is dissolved in the bacterial liquid can be stabilized, and thus the effect of the antibacterial drug on the bacterial liquid can be appropriately evaluated.

(Item 5)

A micro flow path device according to one aspect relates to a micro flow path device configured for a test liquid containing a specimen to be brought into contact with a drug therein and for a test on an action of the drug on the specimen, the device including: a first micro flow path which has a first end and a second end and allows the test liquid to flow therethrough; a storage unit in which the drug is stored and which is connected to the second end such that the test liquid is allowed to flow therethrough; a first opening which communicate with the storage unit; and a gas-permeable membrane which covers the first opening.

According to the micro flow path device described in item 5, when the test liquid flows into the storage unit through the first micro flow path, and the storage unit is filled with the test liquid, the outflow of the test liquid through the first opening is restricted by the gas-permeable membrane. Therefore, the storage unit is filled with the test liquid, and an appropriate amount of the test liquid can be easily stored in the storage unit. As a result, the concentration after the drug is dissolved in the test liquid can be stabilized.

(Item 6)

The micro flow path device according to item 5 further includes: a second micro flow path which allows the storage unit and the first opening to communicate with each other and the test liquid to flow therethrough, wherein the second micro flow path is imaged by a microscope.

According to the micro flow path device described in item 6, the device includes the second micro flow path which allows the storage unit and the first opening to communicate with each other and the test liquid to flow therethrough, and the second micro flow path is imaged by the microscope. Thus, the drug is diffused from the storage unit to the second micro flow path. Therefore, in the second micro flow path, the concentration after the drug is dissolved in the test liquid can be stabilized. As a result, the imaging with the microscope can be performed in a state where the concentration after the drug is dissolved in the test liquid is stable.

(Item 7)

The micro flow path device according to item 6 further includes: a first plate-shaped member; and a second plate-shaped member which is stacked on the first plate-shaped member, wherein the second micro flow path is formed at a boundary between the first plate-shaped member and the second plate-shaped member, and a part of the first plate-shaped member and a part of the second plate-shaped member forming the second micro flow path are transparent.

According to the micro flow path device described in item 7, a part of the first plate-shaped member and a part of the second plate-shaped member forming the second micro flow path are transparent. Thus, it is possible to suppress blocking of light entering the second micro flow path. Therefore, the second micro flow path can be easily imaged with the microscope.

(Item 8)

The micro flow path device according to item 6 or 7 further includes: a plurality of the first micro flow paths; a plurality of the storage units respectively connected to the plurality of first micro flow paths; and a plurality of the second micro flow paths respectively connected to the plurality of storage units, wherein the plurality of second micro flow paths are formed close to each other.

According to the micro flow path device described in item 8, the plurality of second micro flow paths are formed close to each other. Thus, the plurality of second micro flow paths can be imaged by one time of imaging. Therefore, the second micro flow path can be efficiently imaged.

(Item 9)

The micro flow path device according to any one of items 6 to 8 further includes: a second opening which is formed in the first micro flow path, wherein a pump which applies air pressure to the test liquid is connected to the second opening.

According to the micro flow path device described in item 9, the pump which applies air pressure to the test liquid is connected to the second opening. Therefore, when the pump applies air pressure to the test liquid, the storage unit is filled with the test liquid, and an appropriate amount of the test liquid can be easily stored in the storage unit. As a result, the concentration after the drug is dissolved in the test liquid can be stabilized.

(Item 10)

In the micro flow path device according to item 5, the first opening is formed in the storage unit.

According to the micro flow path device described in item 10, the first opening is formed in the storage unit, and thus an appropriate amount of the test liquid can be easily stored in the storage unit. Therefore, the concentration after the drug is dissolved in the test liquid can be stabilized.

(Item 11)

The micro flow path device according to item 10 further includes: a second opening which is formed in the first micro flow path, wherein a pump which applies air pressure to the test liquid is connected to the second opening.

According to the micro flow path device described in item 11, the pump which applies air pressure to the test liquid is connected to the second opening. Therefore, when the pump applies air pressure to the test liquid, the storage unit is filled with the test liquid, and an appropriate amount of the test liquid can be easily stored in the storage unit. As a result, the concentration after the drug is dissolved in the test liquid can be stabilized.

(Item 12)

In the micro flow path device according to item 10 or 11, the first micro flow path includes a first flow path to be imaged by a microscope and a second flow path excluding the first flow path, and the first flow path is formed to have a narrower horizontal width than the second flow path.

According to the micro flow path device described in item 12, the first flow path is formed to have a narrower horizontal width than the second flow path. Therefore, the first flow path can be easily imaged with the microscope.

(Item 13)

The micro flow path device of item 12 further includes: a plurality of the first micro flow paths, wherein each of the plurality of first micro flow paths includes the first flow path and the second flow path, and a plurality of the first flow paths are formed close to each other.

In the micro flow path device described in item 13, the plurality of first flow paths is formed close to each other. Therefore, the plurality of first flow paths can be imaged by one time of imaging of the microscope. As a result, the first flow path can be efficiently imaged.

(Item 14)

The micro flow path device according to item 12 or 13 further includes: a first plate-shaped member; a second plate-shaped member which is stacked on the first plate-shaped member, wherein the first micro flow path is formed at a boundary between the first plate-shaped member and the second plate-shaped member, and a part of the first plate-shaped member and a part of the second plate-shaped member forming the first flow path are transparent.

In the micro flow path device described in item 14, a part of the first plate-shaped member and a part of the second plate-shaped member forming the first flow path are transparent. Thus, it is possible to suppress blocking of light entering the first flow path. Therefore, the first flow path can be easily imaged with the microscope.

(Item 15)

A testing apparatus using a micro flow path device according to an aspect is a testing apparatus in which the micro flow path device is configured for a test liquid containing a specimen to be brought into contact with a drug therein and for a test on an action of the drug on the specimen, the apparatus comprising: the micro flow path device which includes a first micro flow path which has a first end and a second end and allows the test liquid to flow therethrough, a storage unit in which the drug is stored and which is connected to the second end such that the test liquid is allowed to flow therethrough, a first opening which communicate with the storage unit, a gas-permeable membrane which covers the first opening, a second micro flow path which allows the storage unit and the first opening to communicate with each other and the test liquid to flow therethrough, and a second opening which is formed at the first end; a pump which is connected to the second opening and applies air pressure to the test liquid; a table on which the micro flow path device is placed; a drive mechanism which drives the table along a horizontal direction; and a control unit which controls the drive mechanism, wherein the control unit causes the drive mechanism to drive the table such that the second micro flow path is positioned in an imaging region of a microscope.

According to the testing apparatus using the micro flow path device described in item 15, when the test liquid flows into the storage unit through the first micro flow path, and the storage unit is filled with the test liquid, the outflow of the test liquid through the first opening is restricted by the gas-permeable membrane. Therefore, the storage unit is filled with the test liquid, and an appropriate amount of the test liquid can be easily stored in the storage unit. As a result, the concentration after the drug is dissolved in the test liquid can be stabilized.

(Item 16)

In the testing apparatus using the micro flow path device according to item 15, the micro flow path device includes a plurality of the second micro flow paths, and the control unit causes the drive mechanism to drive the table such that each of the plurality of second micro flow paths is positioned in the imaging region of the microscope.

According to the testing apparatus using the micro flow path device described in item 16, the drive mechanism is caused to drive the table such that each of the plurality of second micro flow paths is positioned in the imaging region of the microscope. Therefore, each of the plurality of second micro flow paths can be efficiently imaged.

REFERENCE SIGNS LIST

200 TESTING APPARATUS
100 MICRO FLOW PATH DEVICE
1 PLATE-SHAPED MEMBER
11 FIRST PLATE-SHAPED MEMBER
12 SECOND PLATE-SHAPED MEMBER
2 FLOW PATH STRUCTURE
21 OPENING (FIRST OPENING)
22 MICRO FLOW PATH (FIRST MICRO FLOW PATH, MICRO FLOW PATH)
23 MICRO FLOW PATH (FIRST MICRO FLOW PATH, SECOND FLOW PATH, MICRO FLOW PATH)
24 STORAGE UNIT
25 MICRO FLOW PATH (SECOND MICRO FLOW PATH, MICRO FLOW PATH)
25A MICRO FLOW PATH (FIRST MICRO FLOW PATH, FIRST FLOW PATH, MICRO FLOW PATH)
251 to 254 MICRO FLOW PATH
26 OPENING (SECOND OPENING)
3 GAS-PERMEABLE MEMBRANE
4 SYRINGE PUMP (PUMP, PRESSURE SOURCE)
5 TABLE
6 MICROSCOPE
7 DRIVE MECHANISM
71 MOTOR
8 CONTROL UNIT
9 DISPENSER
AR IMAGING TARGET REGION
DR1, DR2 RIGHT-LEFT DIRECTION
ML MOVING MECHANISM
FV CAPTURED IMAGE
P1 to P28 POSITION
ST DISPENSING STAGE
W1, W2 WIDTH

The invention claimed is:

1. A testing method using a micro flow path device, the micro flow path device being configured for a test liquid containing a specimen to be brought into contact with a drug therein and for a test on an action of the drug on the specimen, the method comprising:
preparing a micro flow path device which includes:
a plurality of micro flow paths;
first openings respectively disposed at one end of each of the plurality of micro flow paths and which communicate with an outside, and a second opening disposed at opposite ends of each of the plurality of micro flow paths and which communicates with an outside;
storage units which store the drug and which are provided in the plurality of micro flow paths, respectively; and
a gas-permeable membrane which covers each first opening;
applying a fluid pressure higher than an external pressure to the test liquid through the second opening from a pressure source connected to the second opening to pressure-feed the test liquid to each storage unit; and
observing a target region set in each micro flow path,
wherein for each micro flow path of the plurality of micro flow paths, the second opening, the storage unit, the target region and the first opening are arranged in this order in a longitudinal direction of the micro flow path.

2. The testing method using the micro flow path device according to claim 1, the method further comprising: holding a state for a predetermined period in which the fluid pressure to the test liquid is applied.

3. The testing method using the micro flow path device according to claim 2, wherein the holding includes applying air pressure to the test liquid.

4. The testing method using the micro flow path device according to claim 1, wherein
the test liquid is a bacterial liquid, and
the drug is an antibacterial drug.

5. A micro flow path device configured for a test liquid containing a specimen to be brought into contact with a drug therein and for a test on an action of the drug on the specimen, the device comprising:
a first micro flow path which has a first end and a second end and allows the test liquid to flow therethrough;
a storage unit in which the drug is stored and which is connected to the second end of the first micro flow path such that the test liquid is allowed to flow therethrough;

a second micro flow path which has a first end and a second end and allows the test liquid to flow therethrough, the storage unit being connected to the first end of the second micro flow path;
a first opening at the second end of the second micro flow path and which communicates with the storage unit via the second micro flow path;
a second opening at the first end of the first micro flow path and which communicates with the storage unit;
a target region set in the second micro flow path; and
a gas-permeable membrane which covers the first opening,
wherein the second opening, the storage unit, the target region and the first opening are arranged in this order in a longitudinal direction of the first and second micro flow paths.

6. The micro flow path device according to claim 5, wherein the target region in the second micro flow path is imaged by a microscope.

7. The micro flow path device according to claim 6, further comprising:
a first plate-shaped member; and
a second plate-shaped member which is stacked on the first plate-shaped member, wherein
the second micro flow path is formed at a boundary between the first plate-shaped member and the second plate-shaped member, and
a part of the first plate-shaped member and a part of the second plate-shaped member forming the second micro flow path are transparent.

8. The micro flow path device according to claim 6, further comprising:
a plurality of the first micro flow paths;
a plurality of the storage units respectively connected to the plurality of first micro flow paths; and
a plurality of the second micro flow paths respectively connected to the plurality of storage units, wherein
the plurality of second micro flow paths are formed adjacent to each other.

9. The micro flow path device according to claim 5, wherein a pump which applies air pressure to the test liquid is connected to the second opening of the first micro flow path.

10. The micro flow path device according to claim 6, wherein a pump which applies air pressure to the test liquid is connected to the second opening of the first micro flow path.

11. The micro flow path device according to claim 5, further comprising:
a first plate-shaped member;
a second plate-shaped member which is stacked on the first plate-shaped member, wherein
the second micro flow path is formed at a boundary between the first plate-shaped member and the second plate-shaped member, and
a part of the first plate-shaped member and a part of the second plate-shaped member forming the second micro flow path are transparent.

12. A testing apparatus using a micro flow path device, the micro flow path device configured for a test liquid containing a specimen to be brought into contact with a drug therein and for a test on an action of the drug on the specimen, the apparatus comprising:
the micro flow path device which includes
a first micro flow path which has a first end and a second end and allows the test liquid to flow therethrough,
a storage unit in which the drug is stored and which is connected to the second end of the first micro flow path such that the test liquid is allowed to flow therethrough,
a second micro flow path which has a first end and a second end and allows the test liquid to flow therethrough, the storage unit being connected to the first end of the second micro flow path,
a first opening at the second end of the second micro flow path and which communicates with the storage unit via the second micro flow path,
a gas-permeable membrane which covers the first opening,
a second opening which is formed at the first end of the first micro flow path and which communicates with the storage unit, and
a target region set in the second micro flow path;
a pump which is connected to the second opening of the first micro flow path and applies air pressure to the test liquid;
a table on which the micro flow path device is placed;
a drive mechanism which drives the table along a horizontal direction; and
a control unit which controls the drive mechanism, wherein
the control unit causes the drive mechanism to drive the table such that the target region in the second micro flow path is positioned in an imaging region of a microscope, and
the second opening, the storage unit, the target region and the first opening are arranged in this order in a longitudinal direction of the first and second micro flow paths.

13. The testing apparatus using the micro flow path device according to claim 12, wherein
the micro flow path device includes a plurality of the second micro flow paths, and
the control unit causes the drive mechanism to drive the table such that the target region of each of the plurality of second micro flow paths is positioned in the imaging region of the microscope.

14. A testing apparatus using a micro flow path device, the micro flow path device configured for a test liquid containing a specimen to be brought into contact with a drug therein and for a test on an action of the drug on the specimen, the apparatus comprising:
the micro flow path device which includes
a first micro flow path which has a first end and a second end and allows the test liquid to flow therethrough,
a storage unit in which the drug is stored and which is connected to the second end such that the test liquid is allowed to flow therethrough,
a first opening which communicates with the storage unit,
a gas-permeable membrane which covers the first opening,
a second micro flow path which allows the storage unit and the first opening to communicate with each other and the test liquid to flow therethrough, and
a second opening which is formed at the first end;
a pump which is connected to the second opening and applies air pressure to the test liquid;
a table on which the micro flow path device is placed;
a drive mechanism which drives the table along a horizontal direction; and a control unit which controls the drive mechanism, wherein the control unit causes the drive mechanism to drive the table such that the second micro flow path is positioned in an imaging region of a microscope.

* * * * *